(12) United States Patent
Blake

(10) Patent No.: US 7,252,042 B1
(45) Date of Patent: Aug. 7, 2007

(54) FERTILIZER SPIKE INJECTION TOOL

(76) Inventor: George Berend Freeman Blake, 1116 Far North Circle, Newmarket (CA) L3X 1N5

( * ) Notice: Subject to any disclaimer, the term of this patent is extended or adjusted under 35 U.S.C. 154(b) by 0 days.

(21) Appl. No.: 11/605,012

(22) Filed: Nov. 29, 2006

(51) Int. Cl.
*A01C 5/02* (2006.01)
(52) U.S. Cl. ....................................................... 111/95
(58) Field of Classification Search ............... 111/100, 111/115, 89, 92, 95
See application file for complete search history.

(56) References Cited

U.S. PATENT DOCUMENTS

| | | | |
|---|---|---|---|
| 1,783,026 A | 11/1930 | Ober | |
| 2,030,770 A | 2/1936 | Smith | |
| 3,113,534 A | 12/1963 | Wessel | |
| 3,414,831 A | 12/1968 | Bishop | |
| 3,892,552 A | 7/1975 | Gay, Jr. | |
| 3,903,815 A | 9/1975 | Winkler | |
| 4,191,116 A | 3/1980 | Allison, Jr. | |
| 4,676,538 A | 6/1987 | Fiedler | |
| 4,813,949 A | 3/1989 | Beard | |
| 5,105,578 A | 4/1992 | Fleuridas | |
| 5,461,992 A | 10/1995 | Scollard | |
| 5,487,236 A | 1/1996 | Moon | |
| 5,558,030 A | 9/1996 | Ward | |
| D389,705 S | 1/1998 | Puett | |
| 6,076,300 A | 6/2000 | Cronin | |
| 6,843,020 B2 | 1/2005 | Lutz | |

*Primary Examiner*—Christopher J. Novosad

(57) ABSTRACT

A tool for injecting solid fertilizer spikes into soil for tree and plant root nutrition utilizing elongated 90° brackets to reduce the step-up height, form a fertilizer load chamber and to provide for a flat spring fertilizer spike retention mechanism such that the tool is fully operable in an upright position wherein a fertilizer spike is left embedded in the ground and detached from the tool without the need to remove the tool from the ground in a manner where, with one process of downward movement of the foot bar, two functions occur simultaneously, namely; the full injection of the fertilizer spike into the soil concurrent with the full release of the fertilizer spike from the tool by the complete ejection of the fertilizer spike from the fertilizer spike load chamber and the flat spring fertilizer spike retention mechanism. The tool is also provided with a spring wire that is adapted such that the fertilizer spike chamber, the injector tube and the foot bar are held in place in the load position until released by downward force by the operator on the top the foot bar.

2 Claims, 6 Drawing Sheets

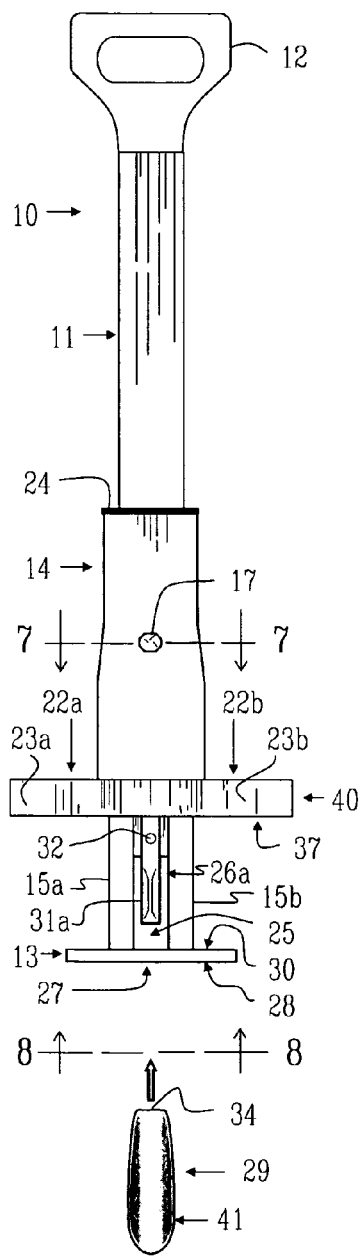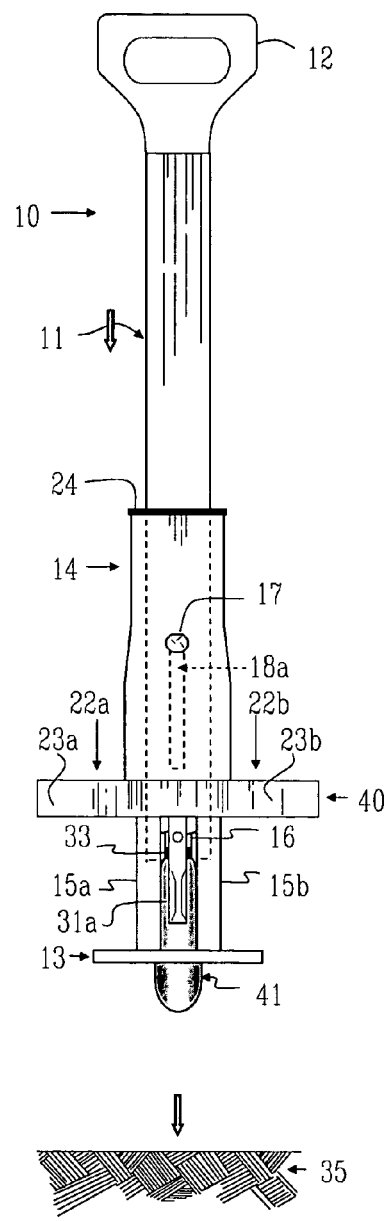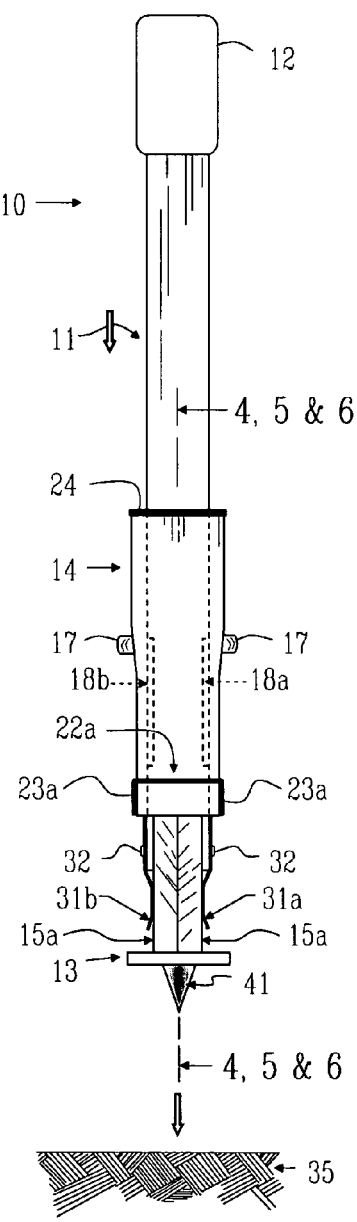

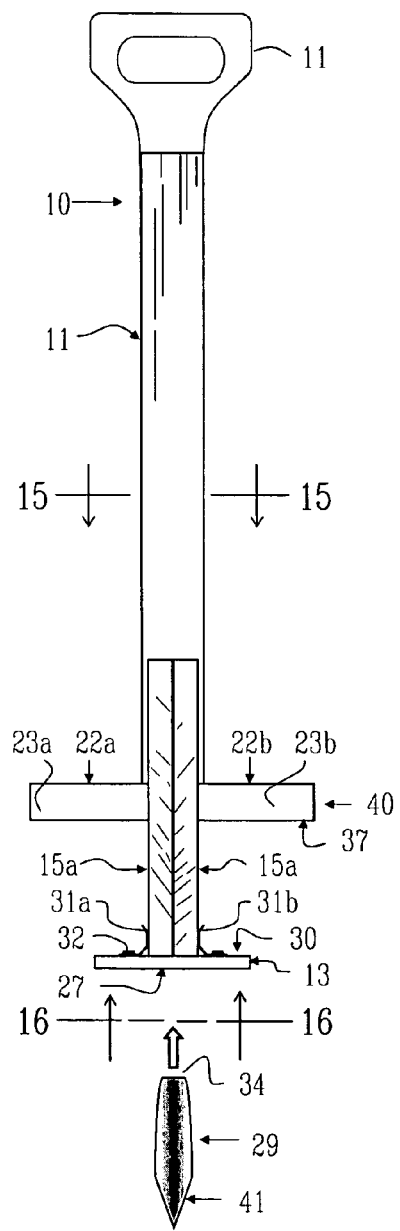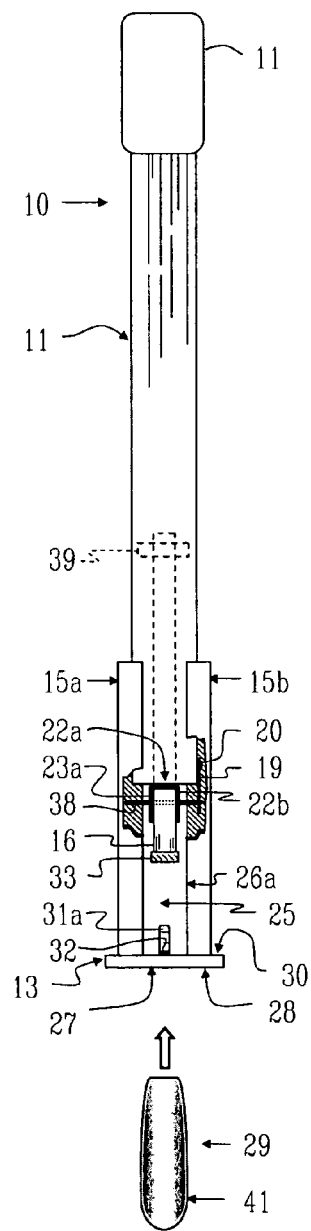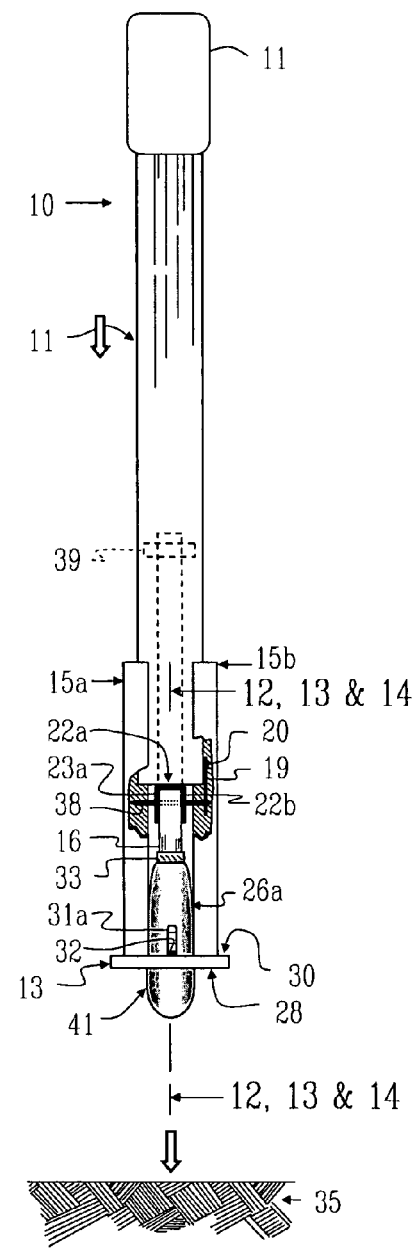

FIG. 12
FIG. 13
FIG. 14
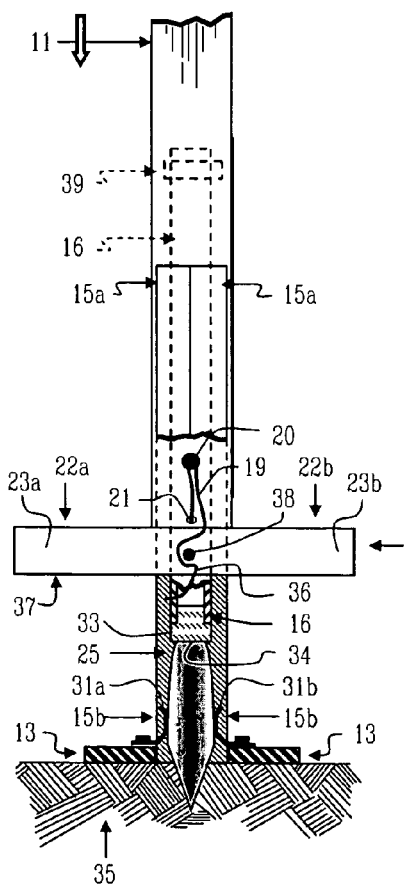
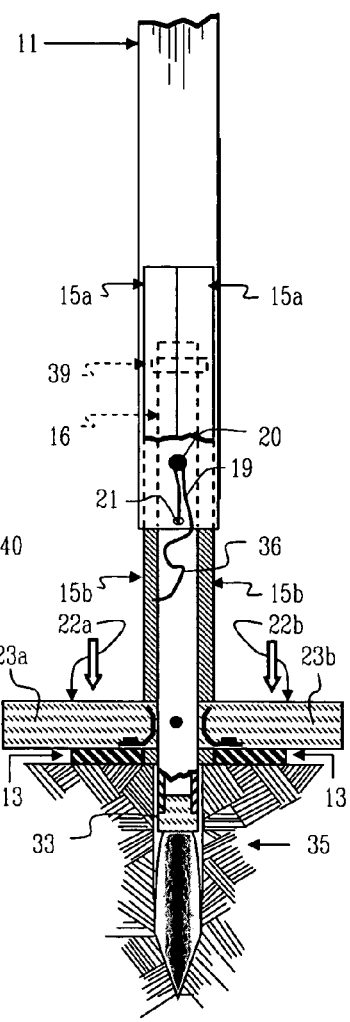
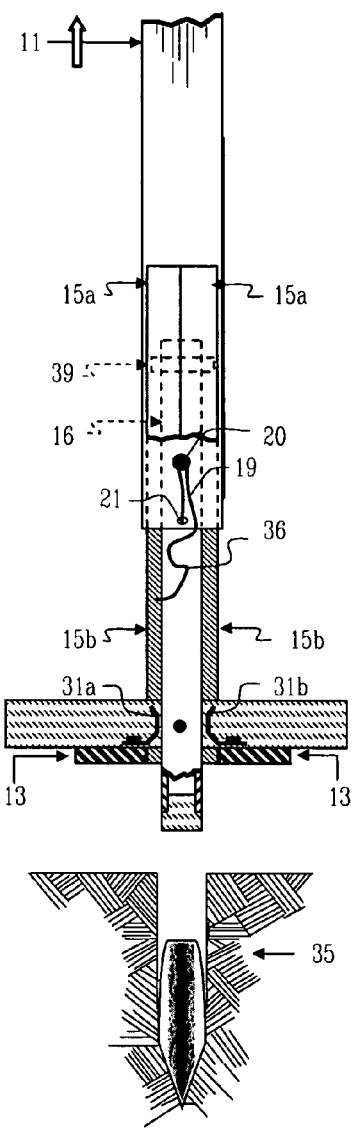

FERTILIZER SPIKE INJECTION TOOL

CROSS REFERENCE TO RELATED APPLICATIONS

Not Applicable

FEDERALLY SPONSORED RESEARCH

Not Applicable

DESCRIPTION OF ATTACHED APPENDIX

Not Applicable

FIELD OF THE INVENTION

This invention falls within the general field of gardening tools and pertains specifically to tools for injecting a solid fertilizer spike into soil for tree and plant root nutrition.

BACKGROUND OF THE INVENTION

The benefits of fertilizer spikes for providing nutrients for trees and shrubs directly below the ground surface is known. Prior fertilizer spike injection tools, however, remain: ineffectual, time consuming and/or cost prohibitive. The prior art shall be referenced to in detail, in this regard.

The available prior art relating to the field of invention might be divided into two tool groups—standalone tools that do not require other tools to used in conjunction with their operation by the user and tools that are auxiliary to other tools required in the operation by the user. For simplicity, it may serve to refer to the former as Primary prior art tools and the latter, as Secondary prior art tools. All prior art refereed to herein, except prior art, U.S. Pat. No. 3,892,552 issued to Jacob Douglas Gay, Jr., on Jul. 1, 1975, would be classified by this definition, as Primary prior art tools. The Primary prior art tools may be further grouped by the means in which the operator applies force onto the tool in the process of injecting the fertilizer spike into the soil, such as: 1) by hand, in a pushing fashion, 2) by hand, in a ramming fashion, 3) by a single foot, in a stomping fashion or 4) by two feet, in a jumping fashion. Product differentiation between each of these categories and within each of these categories is further apparent in that, within each of these categories, options exist based on whether, and if so by what means, will: the fertilizer spike be retained within the fertilizer spike load chamber, the fertilizer spike load chamber and/or fertilizer spike retention mechanism of the tool be inserted into the soil concurrent with the insertion of the fertilizer spike and the inserted fertilizer spike load chamber and/or fertilizer spike retention mechanism be removed from the soil while leaving the fertilizer spike behind.

Numerous problems of injection and ejection exist within each of these categories. Problems associated with the prior art where the fertilizer spike load chamber and/or fertilizer spike retention mechanism is injected into the soil concurrent with the injection of the fertilizer spike include: extraneous operator time, energy and effort required in the injection and ejection processes from overcoming the added friction from injecting extraneous mass such as the fertilizer spike load chamber and/or the fertilizer spike retention mechanism in conjunction with the fertilizer spike, from the soil adhering to the perimeter of the extraneous mass and from clogging and jamming of the fertilizer spike load chamber and/or the fertilizer spike retention mechanism with soil forced between the fertilizer spike and the walls of the fertilizer spike chamber and/or the fertilizer retention mechanism thereby failing to inject or eject the fertilizer spike, requiring maintenance prior to it's next use and causing a decreased range of soil firmness condition applications; difficult, complex, awkward or supplemental procedures and/or special expertise to inject the fertilizer spike into the soil; difficult, complex, awkward or supplemental procedures and/or special expertise and/or the requirement of auxiliary attachments to remove the tool from the soil after injecting the fertilizer spike while leaving the fertilizer spike behind; maintenance of the tool after removing the tool from the soil from soil adherence and exposure to corrosion form soil contamination.

Problems associated with the prior art category where there is excessive step-up height include: ineffectual operation, extraneous effort as well as awkward or unsafe operation from unstable and off-balance operation.

Problems associated with the prior art category where there is no fertilizer spike retention mechanism include: awkward/uncomfortable bending or kneeling to insert the fertilizer spike into the tool or into the ground.

Problems associated with the prior art category where there is no driver rod retention mechanism include: inadvertent displacement of the fertilizer spike prior to injection resulting in time-consuming as well as the need of bending or kneeling to insert the fertilizer spike into the tool resulting in awkward/uncomfortable/time-consuming operation.

Problems associated with the prior art category where there is hand/arm/shoulder movement to push the fertilizer spike into the soil include: extraneous operator time, energy and effort required in the injection process from a restriction to upper body strength resulting in deriving a limited amount of operator force and limiting the range of application due to soil firmness conditions.

Problems associated with the prior art category where there is hand/arm/shoulder movement to repeatedly ram the fertilizer spike into the soil include: excessive cost from damaged fertilizer spikes, extraneous operator time, energy and effort required in the injection process from clogging and jamming of the fertilizer spike load chamber, the fertilizer spike retention mechanism and/or the driver rod head with the end of a broken fertilizer spike, from ongoing replacement and maintenance of the striker pad and the rubber cushion, from partial absorption of the operator's force by the cushioned striker pad and from having to raise and lower a weighted striker rod thereby resulting in: failure to inject or eject the fertilizer spike, limited range of application due to soil firmness conditions and a diminished return of operator effort being derived.

Problems associated with the prior art category that is limited to single-foot pedal include: extraneous operator time, energy and effort required in the injection process from off-balance/off-center operation thereby resulting in deriving a limited amount of operator force and limiting the range of application due to soil firmness conditions as well as awkward or unsafe operation.

Problems associated with the prior art category that is limited to single-foot pedal with reciprocal movement include: extraneous operator time, energy and effort required in the injection process from off-balance/off-center operation thereby resulting in deriving a limited amount of operator force and limiting the range of application due to soil firmness conditions as well as awkward or unsafe operation in addition to extraneous operator energy from the binding resistance of off-centre pedal operation of the sliding foot pedal mechanism to the wall of the structure that contains it resulting in further reduction in the amount of operator force derived, further limiting of the range of application due to soil firmness conditions as well as increased awkward or unsafe operation.

Problems associated with the prior art category where the foot pedal is biased to a retracted position with a coil spring include: extraneous operator time, energy and effort is required during operation to counter the continual resistance of the coil spring resulting in a diminished return of operator effort being derived thereby limiting the range of application due to soil firmness conditions; time consuming, unstable/off-balance/operator jolting/unsafe operation from the disconnection of the driver head of the tool with the contact surface of the fertilizer spike at the time the fertilizer spike/pellet is inserted into this prior art to the moment of contact with the head of the driver rod and because of the step-ledge returning to the original step-on height should the operator step-off the tool before injection has been completed, as is most often the case, resulting in jolting of the operator, unstable and off-balance operation, loss of the visual depth of the injection obtained, a diminished return of operator effort being derived as well as possible clogging and jamming of the fertilizer spike load chamber, the fertilizer spike retention mechanism and/or the driver rod head with the end of a broken fertilizer spike from the ramming effect. There is also the added the cost of the coil spring itself as well.

Problems associated with the prior art where a plastic cap is used as an auxiliary tool in the injection process include: awkward/uncomfortable/timely bending or kneeling to insert the fertilizer spike into the ground; digging out the plastic cap prior art from the soil prior to it's next use; hitting one's fingers with a hammer while steadying the fertilizer spike; requiring other tools in the injection and ejection process which need to be maintained and which can be misplaced in the process.

Problems associated with the prior art without the inability to have simultaneous injection of the fertilizer spike into the soil with the ejection of the fertilizer spike from the fertilizer spike load chamber and the fertilizer spike retention mechanism include: extraneous operator time, energy and effort required in the injection and ejection processes.

DESCRIPTION OF THE PRIOR ART

Prior art within the general field of gardening tools which share the principles of injection and ejection have been sited in the description of the prior art, such as tools used to: introduce free-flowing granular fertilizer into the soil, drive survey stakes, remove and replace a plug of ground or sod or remove weeds, as well as those tools which pertain specifically to inserting a fertilizer spike into soil for tree and plant root nutrition.

U.S. Pat. No. 6,843,020 B2 issued to LeRoy R. Lutz on Jan. 18, 2005 discloses a fertilizer spike and method and apparatus for inserting same into soil. The fertilizer spike injector tool disclosed by Lutz suffers from the aforementioned problems associated with the prior art where the fertilizer spike load chamber and/or fertilizer spike retention mechanism is injected into the soil concurrent with the fertilizer spike and where a tool is designed on hand/arm/shoulder movement to push the fertilizer spike into the soil and as such, has numerous and obvious structural and operational differences compared to the new invention as well as no simultaneous injection of the fertilizer spike into the soil with the ejection of the fertilizer spike from the fertilizer spike load chamber and the fertilizer retention mechanism.

U.S. Pat. No. 6,076,300 issued to Raymond M. Cronin on Jun. 20, 2000 discloses a root-feeding stake which includes a funnel having a downspout that surmounts a first end of an elongate hollow tube to introduce free-flowing granular fertilizer into the soil not a tool used to inject compressed fertilizer spikes and as such, has numerous and obvious structural and operational differences compared to the new invention.

U.S. Pat. No. 5,558,030 issued to Lonnie H. Ward on Sep. 24, 1996 discloses a hand operated plant feeder apparatus to support a chemical dispenser assembly to introduce free-flowing granular fertilizer into the soil not a tool used to inject compressed fertilizer spikes and as such, has numerous and obvious structural and operational differences compared to the new invention.

U.S. Pat. No. 5,487,236 issued to Donald D. Moon on Jan. 30, 1996 discloses a hand operated fertilizing tool by means of which, upon ground penetration, may be swung in a side-to-side and back-to-front motion to introduce free-flowing granular fertilizer into the soil not a tool used to inject compressed fertilizer spikes and as such, has numerous and obvious structural and operational differences compared to the new invention.

U.S. Pat. No. 5,461,992 issued to Robert A. Scollard on Oct. 31, 1995 discloses a deep root tree and shrub fertilizer stake driver tool. The fertilizer spike injector tool disclosed by Scollard suffers from the aforementioned problems associated with the prior art that relies on hand/arm/shoulder movement to inject the fertilizer spike into the soil by repeatedly ramming it and as such, has numerous and obvious structural and operational differences compared to the new invention. Further, this prior art requires the striker rod to be extended through from the base to the entire length to the handle resulting in added cost. Also, this striker rod is weighted adding extraneous operator energy and material cost.

In an alternate embodiment of the invention, while retaining the hand/arm/shoulder movement mechanism to repeatedly ram the fertilizer spike into the soil thereby retaining the problems associated with this method of operation, the tool relies on a single-foot pedal with reciprocal movement and biased to a retracted position with a coil spring, to inject spike extensions of the tool into the ground so as to secure the tool with the ground during the ramming process. This single-foot and off-balance pedal operation tends to cause binding of the sliding foot pedal mechanism to the wall of the structure that contains it as well performing this operation concurrent with the ramming of the tool with one hand and stabilizing the tool with the other hand, results in unstable and off-balance operation, a limited operator force derived and extraneous operator energy. Further, the addition of this alternate embodiment of the invention adds extraneous material costs, operator time and effort in the injection and ejection processes.

Further still, problems arise when a component of the tool is injected into the soil concurrent with the fertilizer spike. In the alternate embodiment of this prior art the operator, for the securement of the tool to the soil, injects the spikes that extend from the tool and encase a plurality of fingers that retain the fertilizer spike, into the ground thereto. This requires extraneous operator energy and effort in the injection and ejection process and from soil being forced between the fertilizer spike and the walls of the fertilizer spike retention fingers and the securement spikes as well as requiring maintenance prior to it's next use from dirt attaching to the securement spikes and dirt clogged between the securement spikes and the plurality of fertilizer spike retention fingers.

U.S. Pat. No. 5,105,578 issued to Andre M. Fleuridas on Apr. 21, 1992 discloses a hand operated fertilizer application tool to introduce free-flowing granular fertilizer into the soil not a tool used to inject compressed fertilizer spikes and as such, has numerous and obvious structural and operational differences compared to the new invention.

U.S. Pat. No. 4,813,494 issued to Larry D. Beard, Larry L. Brigman and John C. Roderick on Mar. 21, 1989 discloses a stake driver for use in driving stakes, hubs, pegs or ginies for surveys, earthwork measurements, and approximate guides for excavation and as such, has numerous and obvious structural and operational differences compared to the new invention. Should the device by Bishop be considered for the purpose of injecting fertilizer spikes, it would suffer the aforementioned problems consistent with prior art designed on hand/arm/shoulder movement to activate a rod within the tool to inject the fertilizer spike into the soil by repeatedly ramming it.

U.S. Pat. No. 4,676,538 issued to Manfred Fiedler on Jun. 30, 1987 discloses a Fertilizer implanting tool for implanting fertilizer spikes into the ground. The fertilizer spike injector tool disclosed by Fiedler has numerous and obvious structural and operational differences compared to the new invention and as such suffer from a number of problems. One problem arises when a component of the tool is injected into the soil as part of the fertilizer spike injection process. In this prior art, the fertilizer spike load chamber and the fertilizer spike retention mechanism are driven into the soil along with the fertilizer spike when injecting the fertilizer spike. Operational problems include: extraneous operator time, energy and effort required in the injection and ejection processes from overcoming the added friction from injecting extraneous mass, from the soil adhering to the perimeter of the extraneous mass and from clogging and jamming of the fertilizer spike load chamber and/or the fertilizer spike retention mechanism with soil forced between the fertilizer spike and the walls of the fertilizer spike chamber and/or the fertilizer retention mechanism thereby failing to inject or eject the fertilizer spike, requiring maintenance prior to it's next use and causing a decreased range of soil firmness condition applications; difficult, complex, awkward or supplemental procedures and/or special expertise to inject the fertilizer spike into the soil; difficult, complex, awkward or supplemental procedures and/or special expertise to remove the tool from the soil after injecting the fertilizer spike while leaving the fertilizer spike behind by awkwardly activating attachments to the device with one hand, while concurrently, having to pull upward on the tool with the other hand; maintenance of the tool after removing the tool from the soil from soil adherence; exposure to corrosion form soil contamination and the inability to have simultaneous injection of the fertilizer spike into the soil with the ejection of the fertilizer spike from the fertilizer spike load chamber and the fertilizer spike retention mechanism.

A further problem with this prior art is in the engagement of the fertilizer spike by angularly outwardly extending fingers at the end of the driver rod. The crumbling nature of a fertilizer spike under force causes the cavity which is formed by said structure to fill, clog and expand thereby preventing insertion of the fertilizer spike as well as requiring maintenance prior to it's next use to permit engagement of the subsequent fertilizer spike.

A further problem with this prior art is that, while there is the engagement of the fertilizer spike by angularly outwardly extending fingers at the end of the driver rod to contain the fertilizer spike within the slideable driver rod, there is no containment/engagement mechanism of the slideable driver rod itself. Consequently, once the spike has been loaded into the engaging end of the slideable driver rod and the tool is inverted for placement on the ground, the weight of the slideable driver rod, which extends the full length of the tool, causes uncontrolled sliding of the driver rod resulting inadvertently releasing the fertilizer spike by being jarred out of it's engagement with the driver rod as well as exposing the operator to pinching from the exposed travel slot actuating mechanism of the fertilizer ejection knob.

A further problem with this prior art is the excessive step-up height to the foot ledge resulting in unstable and off-balance operation as well as use of extraneous operator energy and effort.

U.S. Pat. No. 4,191,116 issued to C. Jay Allison, Jr. and Kirk Willis on Mar. 4, 1980 discloses an Injection Planting Tool for injection planting skeletal plant containers or frames in which a plant is growing rather than a tool used to inject fertilizer spikes and as such has numerous and obvious structural and operational differences compared to the new invention. Should the device by Allison and Willis be considered for the purpose of injecting fertilizer spikes, it would suffer the problems consistent with prior art described previously herein where: a component of the tool is injected into the soil as part of the injection process and as such, problems relate to both the ejection and ejection processes; the tool relies on a single-foot and off-centre pedal for injection of the fertilizer spike; the excessive step-up height to the foot ledge resulting in unstable and off-balance operation as well as use of extraneous operator energy and effort; there is no driver Rod or contact surface at the end of the tool to engage the driving end of the fertilizer stake and there is no ejector rod or contact surface at the end of the tool to engage the driving end of the fertilizer stake or other means to eject the fertilizer spike after insertion.

U.S. Pat. No. 3,903,815 issued to Robert D. Winkler on Sep. 9, 1975 discloses a Fertilizer Applicator Tool to inject bullet-shaped pellets of fertilizer into the ground. The fertilizer spike injector tool disclosed by Winkler has numerous and obvious structural and operational differences compared to the new invention and as such suffer from a number of aforementioned problems consistent with other prior art. One problem arises where the tool relies on a single-foot and off-centre pedal for injection of the fertilizer spike. A Single-foot and off-centre pedal operation results in extraneous operator time, energy and effort required in the injection process from off-balance/off-center operation thereby resulting in deriving a limited amount of operator force and limiting the range of application due to soil firmness conditions as well as awkward or unsafe operation. Further where such single-foot operation is combined with reciprocal movement there is further reduction in the amount of operator force derived, further limiting of the range of application due to soil firmness conditions as well as increased awkward or unsafe operation from the binding of the sliding driver mechanism to the wall of the structure that contains it.

A further problems also exists where a foot pedal and a fertilizer spike driver rod are biased to a retracted position with a coil spring in that, extraneous operator time, energy and effort is required during operation to counter the continual resistance of the coil spring resulting in a diminished return of operator effort being derived thereby limiting the range of application due to soil firmness conditions; time consuming, unstable/off-balance/operator jolting/unsafe operation from the disconnection of the driver head of the tool with the contact surface of the fertilizer spike at the time the bullet shaped pellet is inserted into this prior art and because of the step-ledge returning to the original step-on height should the operator step off the tool before injection has been completed, as is most often the case, resulting in jolting of the operator, unstable and off-balance operation, loss of the visual depth of the injection obtained, a diminished return of operator effort being derived as well as possible clogging and jamming of the fertilizer spike load chamber, the fertilizer spike retention mechanism and/or the driver rod head with the end of a broken fertilizer spike from the ramming effect. There is also the added the cost of the coil spring itself as well.

A further problem with this prior art is the excessive step-up height to the foot ledge resulting in unstable and off-balance operation as well as use of extraneous operator energy and effort. This problem exists in the prior art, as the foot bar is located on top of the travel slot that provides the longitudinal reciprocal movement of the driver rod and impassibly above the fertilizer spike load chamber. As the length of the travel slot that provides the longitudinal reciprocal movement of the driver rod activating mechanism is the combined length of the fertilizer spike and the distance below grade the fertilizer spike is to be driven, the step-up height of the foot bar from the ground, were the same size fertilizer spike to be used, would be approximately 13" in the prior art compared to approximately 6½" for the new invention. The new invention overcomes this problem of excessive step-up height by transferring the foot bar 40 to the bottom end of the travel slot 18a and 18b that provides the longitudinal reciprocal movement of the driver rod and immediately and passably on top of to the fertilizer spike chamber 25 by the fixing of the foot bar 40 to the bottom end of the foot bar collar 14 which is then longitudinally moveable over the two diametrically opposing elongated 90° brackets 15a and 15b which form the fertilizer spike chamber 25 and in the case of the alternate embodiment of the new invention, discussed further, by the placing of the foot bar 40 passably on top of to the fertilizer spike chamber 25 and longitudinally reciprocal within the two diametrically opposing elongated 90° brackets 15a and 15b which form the fertilizer spike chamber 25.

Winkler discloses a flat plate surrounding the tubular member open end extending normal to the axis of the tubular member adapted to engage the ground and support the tubular member thereon and not adapted to either retain or insert the bullet shaped pellets of fertilizer therethrough. Instead, the bullet shaped pellets of fertilizer are inserted above the base plate through a slot disposed in the tubular member sidewall immediately above the base plate of a size and configuration to permit insertion therethrough of the bullet shaped fertilizer pellets into the chamber. As such, and unlike the base plate of the new invention, several associated problems arise. Firstly, the tool cannot be loaded from an upright position and therefore requires awkward kneeling of the operator to load the fertilizer spike from the side of the tool, which may still fall out of the opening, while the tool rests on the ground. This process becomes awkward, uncomfortable and slow as a result. Secondly, as there is no securement of the tool to the ground at commencement by either the tool or the fertilizer spike within the tool, any movement by the operator prior to the injection of the fertilizer spike causes realignment of the tool to the ground resulting in displacement of the spike leading to awkward operation and/or incomplete injection of the fertilizer spike. Thirdly, the fertilizer spike driver rod is biased to a retracted position with a coil spring to provide clearance to allow for sidewall entry of the fertilizer spike into the fertilizer chamber and as such, invokes the aforementioned problems where a foot pedal and a fertilizer spike driver rod are biased to a retracted position with a coil spring.

U.S. Pat. No. 3,892,552 issued to Jacob Douglas Gay, Jr., on Jul. 1, 1975 discloses a molded rubber or plastic protective cap for driving wedge-shaped fertilizer spikes into soil with a hammer rather than injecting fertilizer spikes in it's own right and as such has numerous and obvious structural and operational differences compared to the new invention. Problems with this prior art relate to the excessive amount of inconvenience, time, energy and labor required as well as the risk of injury in the utilization of the prior art as the operator: kneels on the ground rather than stands upright, uses a hammer to hammer the fertilizer spike into the soil, digs-out the prior art from the soil after hammering the fertilizer spike into the soil, cleans soil from the contact end of the hammer from a misplaced blow and the hammer prongs used to dig out the prior art for use on the next fertilizer spike after the fertilizer spike has been installed, unclogs the fertilizer cap prior to it's next use due to broken pieces of fertilizer contained in the fertilizer cap, risks misplacing the hammer and/or the prior art between applications and risks hitting one's fingers while steadying the fertilizer spike in hammering the prior art.

U.S. Pat. No. 3,414,831 issued to F. M. Bishop on Dec. 17, 1968 discloses a Golf Cup Hole cutting device rather than a tool for injecting fertilizer spikes and as such has numerous and obvious structural and operational differences compared to the new invention. Should the device by Bishop be considered for the purpose of injecting fertilizer spikes, it would suffer the problems consistent with prior art described previously herein where: the fertilizer spike load chamber and/or the fertilizer spike retention mechanism is injected into the soil as part of the process; a foot bar is not used for injection, but rather for ejection; the operator is exposed to injury from pinching from the exposed travel slot actuating mechanism of the ejection foot bar and the requirement of additional components for the retention of the fertilizer spike.

U.S. Pat. No. 3,113,534 issued to L. E. Wessel on Dec. 10, 1963 discloses a Root Feeding Tool And Method that can be used to introduce free-flowing granular fertilizer into the soil not a tool used to inject compressed fertilizer spikes whereby there is no means of injection of a fertilizer spike and further, suffers the problems consistent with prior art described previously herein where: a component of the tool is injected into the soil as part of the process; the step-up height to the foot ledge is excessive and the operator stands on one-foot and off-centre of the tool.

U.S. Pat. No. 2,030,770 issued to R. L. Smith on Feb. 11, 1936 discloses a Weed Puller rather than a tool for injecting fertilizer spikes and as such has numerous and obvious structural and operational differences compared to the new invention. Should the device by Smith be considered for the purpose of injecting fertilizer spikes, it would suffer the problems consistent with prior art described previously herein where: the fertilizer spike retention mechanism is injected into the soil as part of the injection process and as such, problems relate to both the ejection and ejection processes; there is excessive step-up height to the tool; the tool relies on a single-foot and off-centre pedal for injection of the fertilizer spike; there is no fertilizer spike retention mechanism and the ejector rod mechanism is biased to a retracted position with a coil spring.

U.S. Pat. No. 1,738,026 issued to W. R. Ober on Nov. 25, 1930 discloses a Transplanting Device rather than a tool for injecting fertilizer spikes and as such has numerous and obvious structural and operational differences compared to the new invention. Should the device by Ober be considered for the purpose of injecting fertilizer spikes, it would suffer the problems consistent with prior art described previously herein where: the fertilizer spike load chamber and fertilizer spike retention mechanism is injected into the soil as part of the injection process and as such, problems relate to both the ejection and ejection processes; the tool relies on a single-foot and off-centre pedal for injection of the fertilizer spike and there is no fertilizer spike retention mechanism.

U.S. Pat. No. Des. 389,705 issued to Shawn J. Puett on Jan. 27, 1998 discloses an ornamental design for a ground engaging fertilizer delivery tube to introduce free-flowing granular fertilizer into the soil rather than a tool for injecting fertilizer spikes and as such has numerous and obvious structural and operational differences compared to the new invention.

BRIEF SUMMARY OF THE INVENTION

The objective of this invention is to inject fertilizer spikes into the soil to fertilize trees and shrubs and, by it's provision of a novel construction, arrangement and combination of parts, to resolve the aforementioned problems associated with the prior art, namely by: eliminating extraneous operator time, energy and effort as well as /uncomfortable/unstable/off-balance/unsafe operation; reducing the step-up height to the foot bar; avoiding difficult, complex, awkward or supplemental procedures and/or special expertise to inject the fertilizer spike into the soil and to remove the tool from the soil while leaving the fertilizer spike behind; avoiding inadvertent displacement of the fertilizer spike; eliminating the need of maintenance to remove adhered soil from the tool and for ongoing replacement and maintenance of striker pad and rubber cushion; reducing exposure to corrosion from soil contamination; deriving an increased return from the amount of operator force applied; increasing the range of soil firmness condition applications; providing for simultaneous injection of the fertilizer spike into the soil with the ejection of the fertilizer spike from the fertilizer spike load chamber and fertilizer spike retention mechanism; providing for full operation in an upright position as well as reducing manufacturing cost.

The aforementioned problems associated with the prior art designed where the fertilizer spike load chamber and/or the fertilizer spike retention mechanism is driven into the soil along with the fertilizer spike when injecting the fertilizer spike have been eliminated in that the new invention was designed not to require the fertilizer spike load chamber 25 or the fertilizer spike retention mechanism 31a and 31b to be driven into the soil along with the fertilizer spike when injecting the fertilizer spike. And further, the driver rod has been designed such that it trails the fertilizer spike in a frictionless-ground manner to avoid the resistance and adherence of soil.

The aforementioned problems associated with the prior art designed where there is excessive step-up height have been eliminated in that the new invention step-up height of approximately 6½" is less than the riser of a normal stair step. In the prior art, the foot bar is located on top of the travel slot that provides the longitudinal reciprocal movement of the driver rod and impassibly above the fertilizer spike load chamber. As the length of the travel slot that provides the longitudinal reciprocal movement of the driver rod activating mechanism is the combined length of the fertilizer spike and the distance below grade the fertilizer spike is to be driven, the step-up height of the foot bar from the ground, were the same size fertilizer spike to be used, would be approximately 13" in the prior art compared to approximately 6½" for the new invention. The new invention overcomes this problem of excessive step-up height by adapting the foot bar 40 to the bottom end of the travel slot 18a and 18b that provides the longitudinal reciprocal movement of the driver rod and immediately on top of and passably over the fertilizer spike chamber 25 by the fixing of the foot bar 40 to the bottom end of the foot bar collar 14 which is then longitudinally moveable over the two diametrically opposing elongated 90° brackets 15a and 15b which form the fertilizer spike chamber 25 and in the case of the alternate embodiment of the new invention, discussed further, by the placing of the foot bar 40 passably on top of the fertilizer spike chamber 25 and longitudinally reciprocal within the two diametrically opposing elongated 90° brackets 15a and 15b which form the fertilizer spike chamber 25.

The aforementioned problems associated with the prior art designed where there is no fertilizer spike retention mechanism have been eliminated in that the new invention uses a novel flat spring design 31a and 31b which also, by it's design and location on the tool 10, eliminates the problems with the prior art where the fertilizer spike retention mechanism is driven into the soil along with the fertilizer spike when injecting the fertilizer spike.

The aforementioned problems associated with the prior art designed where there is no driver rod retention mechanism have been eliminated in that the new invention uses a novel wire spring 19 design to provide effortless lock, load and release operation.

The aforementioned problems associated with the prior art designed where there is hand/arm/shoulder movement to push the fertilizer spike into the soil include, hand/arm/shoulder movement to repeatedly ram the fertilizer spike into the soil or single-foot off-center pedal operation have been eliminated in that the new invention uses dual-foot on-center operation as well as slide guides.

The aforementioned problems associated with the prior art designed where there is the foot pedal and/or the driver rod biased to a retracted position with a coil spring have been eliminated in that the new invention uses a novel wire spring 19 design to provide effortless lock, load and release operation along with providing for continuous contact between the contact surface of the fertilizer spike 34 and the contact surface 33 of the injector tube 16.

The aforementioned problems associated with the prior art where auxiliary tools are required in the injection process have been eliminated in that the new invention is the only tool required.

The aforementioned problems associated with the prior art where the injection of the fertilizer spike is a detached process from the ejection of the fertilizer spike from the tool thereby requiring auxiliary functions and/or attachments have been eliminated in that the new invention in a manner wherein a fertilizer spike is left embedded in the ground and detached from the tool without the need to remove the tool from the ground where, with one process of downward movement of the foot bar 40, two functions occur simultaneously, namely; the full injection of the fertilizer spike into the soil concurrent with the full release of the fertilizer spike from the tool 10 by the complete ejection of the fertilizer spike from the fertilizer spike load chamber 25 and the fertilizer spike retention mechanism 31a and 31b of the tool 10.

BRIEF DESCRIPTION OF THE DRAWINGS

The same reference numerals refer to the same parts throughout the various Figures.

FIG. 1 is a front elevation view of the fertilizer spike tool constructed in accordance with this new invention shown before loading the fertilizer spike into the fertilizer spike load chamber.

FIG. 2 is a front elevation view of the fertilizer spike tool constructed in accordance with this new invention showing a fertilizer spike contained therein, prior to injection into the soil.

FIG. 3 is a side elevation view of the fertilizer spike tool constructed in accordance with this new invention showing a fertilizer spike contained therein prior to injection into the soil.

FIG. 9 is a front elevation view of the fertilizer spike tool but constructed in accordance with an alternate embodiment of this new invention shown before loading the fertilizer spike into the fertilizer spike load chamber.

FIG. 10 is a front elevation having a partial sectional view of the fertilizer spike tool but constructed in accordance with an alternate embodiment of this new invention showing a fertilizer spike contained therein, prior to injection into the soil.

FIG. 11 is a side elevation having a partial sectional view of the fertilizer spike tool but constructed in accordance with an alternate embodiment of this new invention showing a fertilizer spike contained therein prior to injection into the soil.

FIG. 12 is a partial operational cross sectional view of the tool taken along line 12, 13 & 14-12, 13 & of FIG. 11 looking in the direction of the arrow showing a fertilizer spike contained therein prior to the downward force of the operator on the foot bar and prior to the release of the fertilizer spike driver mechanism.

FIG. 13 is a partial operational cross sectional view of the tool shown in FIG. 11 taken along line 12, 12 & 14-12, 13 & of FIG. 11 looking in the direction of the arrow showing a fertilizer spike ejected from the tool into the soil and the release of the fertilizer spike driver mechanism after the downward force of the operator on the foot bar.

FIG. 14 is a partial operational cross sectional view of the tool shown in FIG. 11 taken along line 12, 12 & 14-12, 13 & of FIG. 1 looking in the direction of the arrow after the removal of the tool from the soil.

REFERENCE NUMERALS IN DRAWINGS

Figure 4:
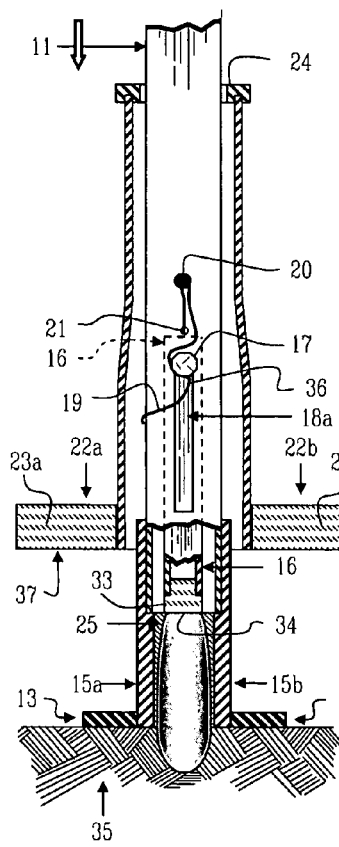
FIG. 4 is a partial operational cross sectional view of the tool taken along line 4, 5 & 6-4, 5 & 6 of FIG. 3 looking in the direction of the arrow showing a fertilizer spike contained therein prior to the downward force of the operator on the foot bar and prior to the release of the fertilizer spike driver mechanism.

| | | |
|---|---|---|
| 10 | | Complete Tool |
| 11 | | Handle shaft |
| 12 | | Handle/End Cap |
| 13 | | Base Plate |
| 14 | | Foot Bar Collar |
| 15 | a | Front Left 90° bracket |
| | b | Front Right 90° bracket |
| 16 | | Injector Tube |
| 17 | | Bolt & Nut assembly |
| 18 | a | Slot - Handle front: for the Foot Bar and Injector Tube 16 travel |
| | b | Slot - Handle rear: for the Foot Bar and Injector Tube 16 travel |
| 19 | | Wire Spring - for retention of the Foot Bar and Anvil Assembly |
| 20 | | Rivet or the like to secure the Wire Spring |
| 21 | | Hole to accommodate the end of the Wire Spring |
| 22 | a | Foot Bar ledge at the front left |
| | b | Foot Bar ledge at the front right |
| 23 | a | Flange of the Foot Bar - front left |
| | b | Flange of the Foot Bar - front right |
| 24 | | Edging formed around the top peripheral edge of foot bar collar 14 |
| 25 | | Open-ended elongated hexagonal shaped chamber to accommodate fertilizer spike 29 |
| 26 | a | Elongated side space in chamber 25 |
| | b | Elongated side space in chamber 25 |
| 27 | | Elongated hexagonal shaped aperture in the ground engaging Base Plate 13 |
| 28 | | The underside 28 of plate 13 for loading therethrough fertilizer spike 29 |
| 29 | | Fertilizer Spike |
| 30 | | Topside of Base Plate 13 |
| 31 | a | Flat Spring - Fertilizer Spike retention at the front |
| | b | Flat Spring - Fertilizer Spike retention at the rear |
| 32 | | Rivet/bolt/weld to fix Flat Spring for Fertilizer Spike retention |
| 33 | | Plug/End Cap |
| 34 | | Top contact surface of the fertilizer spike |
| 35 | | Soil |
| 36 | | Arc/lock-point in the Wire Spring 19 |
| 37 | | Underside of the foot bar flanges 23a and 23b |
| 38 | | Guide Bolt |
| 39 | | Guide Ring |
| 40 | | Foot bar consisting of Foot Bar ledge 22a/22b and Foot Bar Flange 23a/23b |
| 41 | | Ground engaging tip portion of the fertilizer spike 29 |

DETAILED DESCRIPTION OF THE INVENTION

FIG. 1 shows a tool, generally designated as 10, which is specifically adapted for injecting fertilizer spikes into the ground. The tool consists of a hollow elongated circular handle shaft 11 approximately 1⅛" in diameter and 35" in length, onto which is connected a handle or end cap 12 at the upper end, a rectangular flat base plate 13 approximately ¹⁄₁₆" by 2½" by 3¾" in size at the lower end, two identical diametrically opposing elongated 90° brackets 15a and 15b fixedly connecting the topside 30 of the base plate 13 to the lower end of handle shaft 11 and a foot bar 40 perpendicularly fixed to a foot bar collar 14 which is longitudinally moveable over and concentric to the lower end of handle shaft 11 and the two diametrically opposing elongated 90° brackets 15a and 15b.

Figure 7:
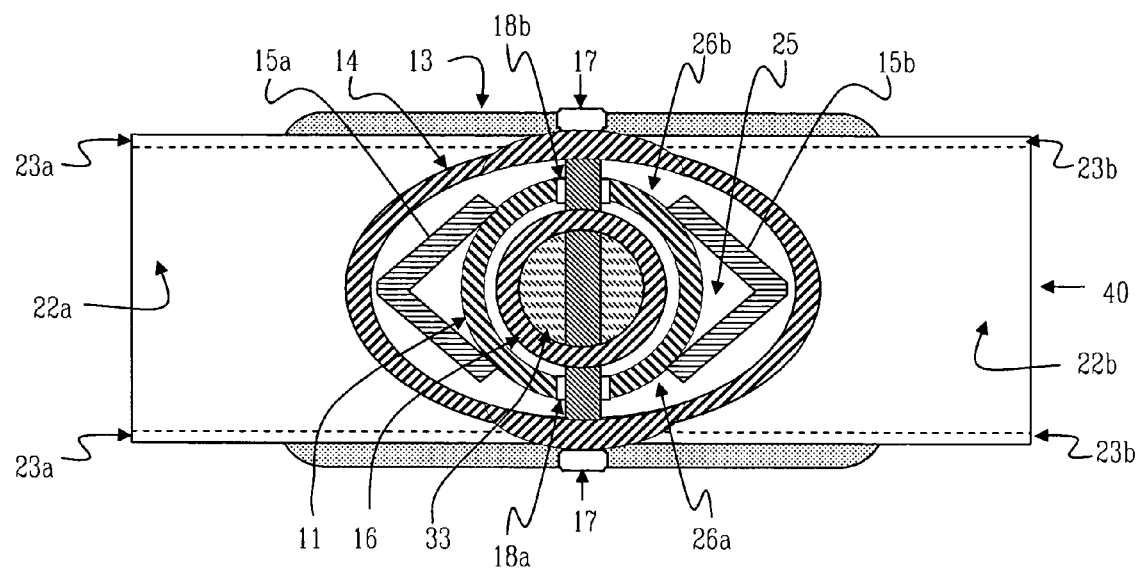
FIG. 7 is a top-down view of the tool taken along line 7-7 of FIG. 1 looking in the direction of the arrow.
Figure 8:
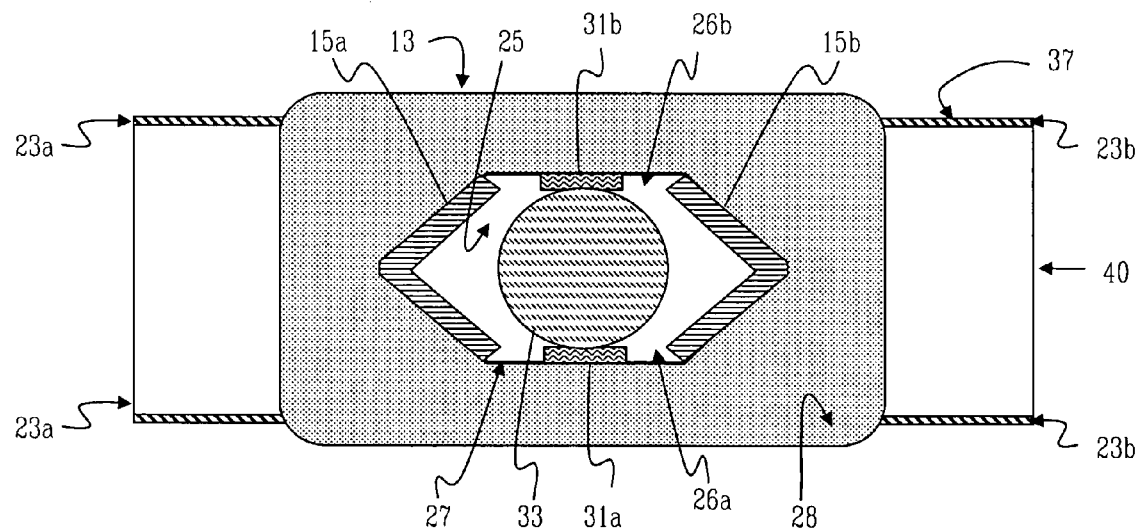
FIG. 8 is a bottom-up view of the tool taken along line 8-8 of FIG. 1 looking in the direction of the arrow.

The two identical diametrically opposed elongated 90° brackets 15a and 15b approximately 6" long and ½ wide are vertically and open-face fixedly connected to the periphery of handle shaft 11 at the open bottom end by welding, soldering and the like, such that an open-ended elongated hexagonal shaped chamber 25 with elongated side spaces 26a and 26b are formed as shown in FIG. 7 and FIG. 8. Brackets 15a and 15b and consequently the bottom open end of chamber 25, extend vertically from beyond the lower end of handle shaft 11 through a conforming elongated hexagonal shaped aperture 27 in the centre of the base plate 13, to terminate at the underside 28 of base plate 13 for loading therethrough the fertilizer spike 29. Brackets 15a and 15b are fixed perpendicularly to base plate 13 by riveting, welding, soldering, and the like. Chamber 25 and hence the portion of the brackets 15a and 15b which extend from the end of handle shaft 11, is of a length which is sufficiently long enough to accommodate only that portion of the fertilizer spike 29 which is not considered to be part of the fertilizer spike's ground engaging tapered tip 41. The ground engaging tapered tip 41 portion of the fertilizer spike 29 that is not contained within Chamber 25 extends outward from the underside 38 of the base plate 13 as a means of engaging the soil for the purpose of securing the tool 10 with the ground. The interior dimensions of Chamber 25 are slightly larger than the exterior dimensions of the fertilizer spike 29 such that the fertilizer spike 29 fits snug yet slideable within it. Alternatively, brackets 15a and 15b may terminate and be fixed on the topside 30 of base plate 13 or be an integral part of base plate 13 so long as the elongated hexagonal shaped aperture 27 in the ground engaging base plate 13, shown in FIG. 7, remains directly over and inline with the elongated hexagonal shaped chamber 25 formed by brackets 15a and 15b and all else remains the same.

Two flat springs 31a and 31b are fixed by rivet 32, screw, welding, soldering, and the like, to the peripheral end of handle shaft 11 such that they fit parallel with brackets 15a and 15b and vertically equidistant within the open sides spaces 25a and 25b of the elongated hexagonal shaped chamber 25 for frictional engagement of the fertilizer spike 29. Alternatively, the two flat springs 31a and 31b may be fixed perpendicular onto the topside 30 of plate 13 or the exterior sides of brackets 15a and 15b such that they occupy the open sides spaces 26a and 26b of the elongated hexagonal shaped chamber 25 and allow the foot bar collar 14 to be longitudinally moveable over them to the topside 30 of the base plate 13. In all cases, the two flat springs 31a and 31b serve by their design and mechanical nature, to easily receive and sufficiently hold the fertilizer spike 29 within the chamber 25 when it has been inserted by the operator through aperture 27 until ejected by the injector tube 16.

The injector tube 16, disposed within the lower end of the elongated circular handle shaft 11 and the elongated 90° brackets 15a and 15b, is an elongated circular tube, which, by it's reduced outside diameter to that of the interior diameter of handle shaft 11, allows for longitudinal reciprocal movement within handle shaft 11 and the elongated 90° brackets 15a and 15b. At the lower end the injector tube 16 extends approximately 2 inches through an accommodating elongated hexagonal shaped aperture in the centre of the foot bar 40 and terminates with a force-fit elongated circular plug/end cap 33 to engage the top contact surface end 34 of the fertilizer spike 29 having been loaded into chamber 25 through the elongated hexagonal shaped aperture 27 on the underside 28 in the base plate 13. The overall length of injector tube 16, inclusive of the plug/end cap 33, is approximately 12". In the load position, that being the uppermost position shown in FIG. 1 to FIG. 4, the outermost tip of plug/end cap 33 is in line with the top of chamber 25. In the fully injected position, that being the lowermost position shown in FIG. 5 and FIG. 6, the outermost tip of plug/end cap 33 extends approximately 2" beyond the underside 28 of base plate 13. The approximate overall 1" length of plug/end cap 33 consists of two sections each having a different diameter. The narrower section, having a diameter slightly larger than the inside diameter of handle shaft 11 such that with marginal force, it may be disposed and retained within handle shaft 11, is approximately ½" in length. The wider section, having a diameter equal to the outside diameter of injector tube 16, extends outward from the end of injector tube 16 by approximately ½" and has a diameter slightly smaller than the diameter of the fertilizer spike 29 at it's widest point allowing plug/end cap 33 and injector tube 16 to trail in the path of fertilizer spike 29 without friction with the soil 35 thereby reducing operator effort in both the injection and ejection processes as well as to avoiding adherence of soil 35 to the tool thereby eliminating the time and work of operator maintenance as well as corrosion to any part of the tool 10 from the soil 35.

Figure 5:
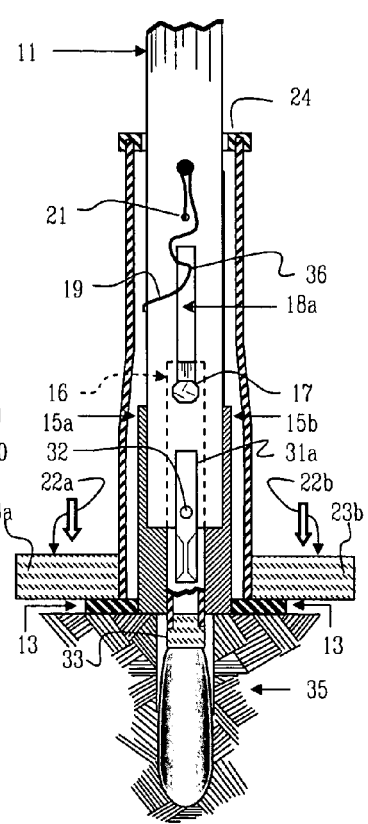
FIG. 5 is a partial operational cross sectional view of the tool taken along line 4, 5 & 6-4, 5 & 6 of FIG. 3 looking in the direction of the arrow showing a fertilizer spike ejected from the tool into the soil and the release of the fertilizer spike driver mechanism after the downward force of the operator on the foot bar.
Figure 6:
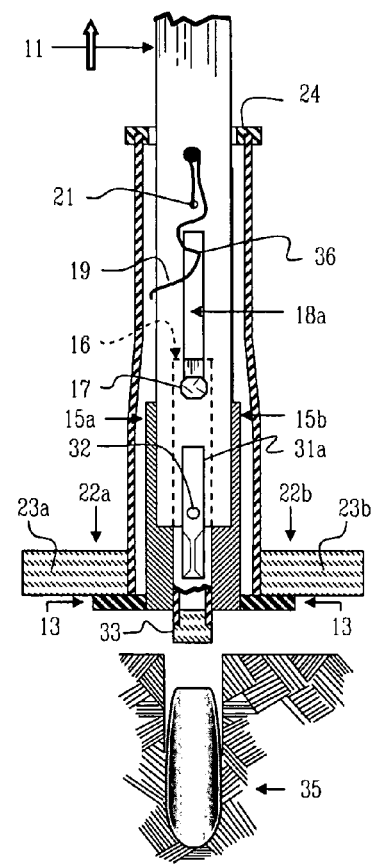
FIG. 6 is a partial operational cross sectional view of the tool taken along line 4, 5 & 6-4, 5 & 6 of FIG. 3 looking in the direction of the arrow after the removal of the tool from the soil.

The foot bar collar 14 is connected to the injector tube 16 to by means of a bolt 17 passing through compliant holes in the upper end of the injector tube 16, through compliant holes in the mid section of foot bar collar 14 and through diametrically opposing elongated slots 18a and 18b formed in the side walls of the lower end of handle shaft 11 thereby allowing the foot bar collar 14 and the injector tube 16 to move simultaneously from the uppermost position shown in FIG. 1 to FIG. 4, to the lowermost position shown in FIG. 5 and FIG. 6. The length of the foot bar collar 14, inclusive of the foot bar flanges 23a and 23b is approximately 13½". The foot bar collar 14 is comprised of an integrated upper and lower section of approximate equal length. The upper section consists of a hollow elongated circular tube, having an inside diameter slightly larger than the outside diameter of handle shaft 11 such that it is longitudinally reciprocally moveable over and concentric to handle shaft 11. The lower section, transitional from the upper section, forms an open-ended elongated hexagonal shaped chamber with a diameter such that it is longitudinally reciprocally moveable over the two diametrically opposing elongated 90° brackets 15a and 15b to the topside 30 of the base plate 13.

Foot bar flanges 23a and 23b and subsequent foot ledges 22a and 22b, collectively referred to as the foot bar 40, are in the form of an inverted "U" shaped channel member, approximately 9" long, 1½" wide and 1¼" deep with an elongated hexagonal shaped aperture located on-center at mid-length of foot bar flanges 23a and 23b to accommodate the bottom end of the foot bar collar 14 onto which it is fixed by welding, soldering and the like.

The elongated hexagonal transition from the circular shape of the foot bar collar 14 may be obtained by numerous methods such as machine stamping the lower end of a circular tube or by cutting two diametrically opposing elongated slots in the side walls of a circular tube from the lower end to the midway point and fixedly connecting by welding, soldering and the like, elongated 90° brackets open-face covering the periphery of said slots. Alternatively, the foot bar flanges 23a and 23b, and subsequent foot ledges 22a and 22b, may be integrated with the foot bar collar 14 as a unit when formed by either the tool and die stamping of sheet metal or by moulded plastic. Regardless of the method of manufacture, so long as the function of this invention is maintained by means of adapting the foot bar 40 to the bottom end of the travel slot 18a and 18b that provides the longitudinal reciprocal movement of the driver rod and immediately on top of and passably over the fertilizer spike chamber 25.

Edging, 24 made of plastic or the like, is formed around the top peripheral edge of foot bar collar 14 to facilitate smooth concentric longitudinal reciprocal movement of handle shaft 11.

Wire Spring 19, secured by a fastener such as a rivet or the like 20 to the side wall of handle shaft 11 and a compliant hole 21 in the side wall of handle shaft 11 such that the wire spring 19 extends over slot 18*a*, and is sized and positioned such that when the foot bar collar 14 is raised by the operator upward towards the handle/end cap 12, bolt 17 is moved to the uppermost position and passing the arc/lock-point 36 in the wire spring 19 with minimal effort, becomes engaged thereto, causing the injector tube 16, the foot bar collar 14 and the foot ledges 22*a* and 22*b* to be held in place in the load position until released by downward force by the operator on the top of foot ledges 22*a* and 22*b* of the foot bar flanges 23*a* and 23*b*, which are fixed perpendicular around the circumference of the lower end of the foot bar collar 14 by welding, soldering, and the like.

Figure 15:
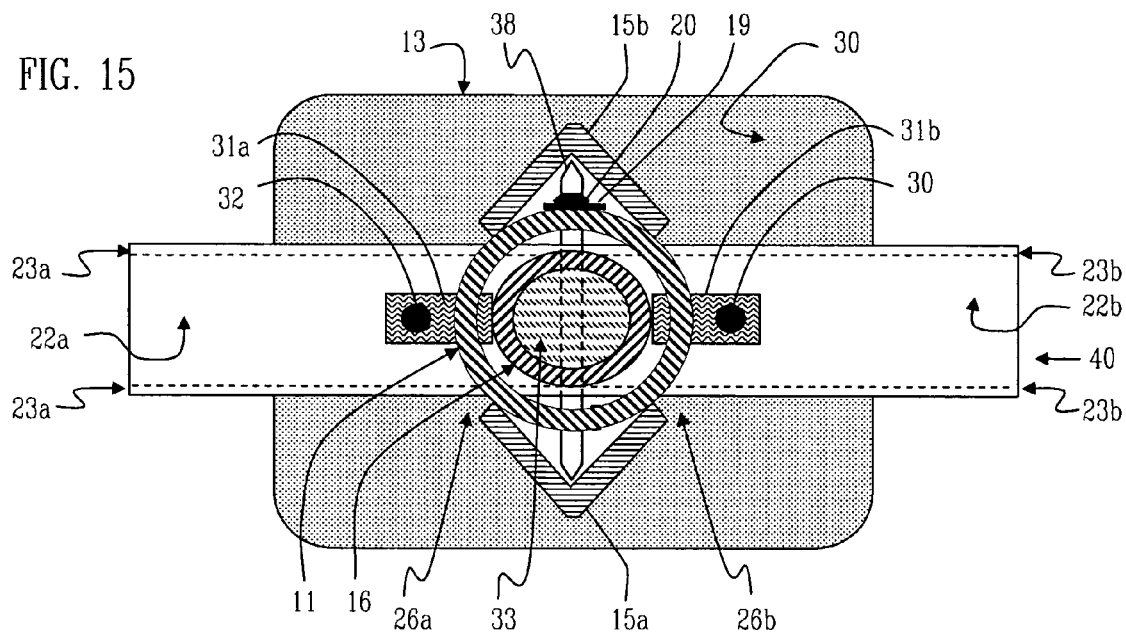
FIG. 15 is a top-down view of the tool taken on line 15-15 of FIG. 9 looking in the direction of the arrow.
Figure 16:
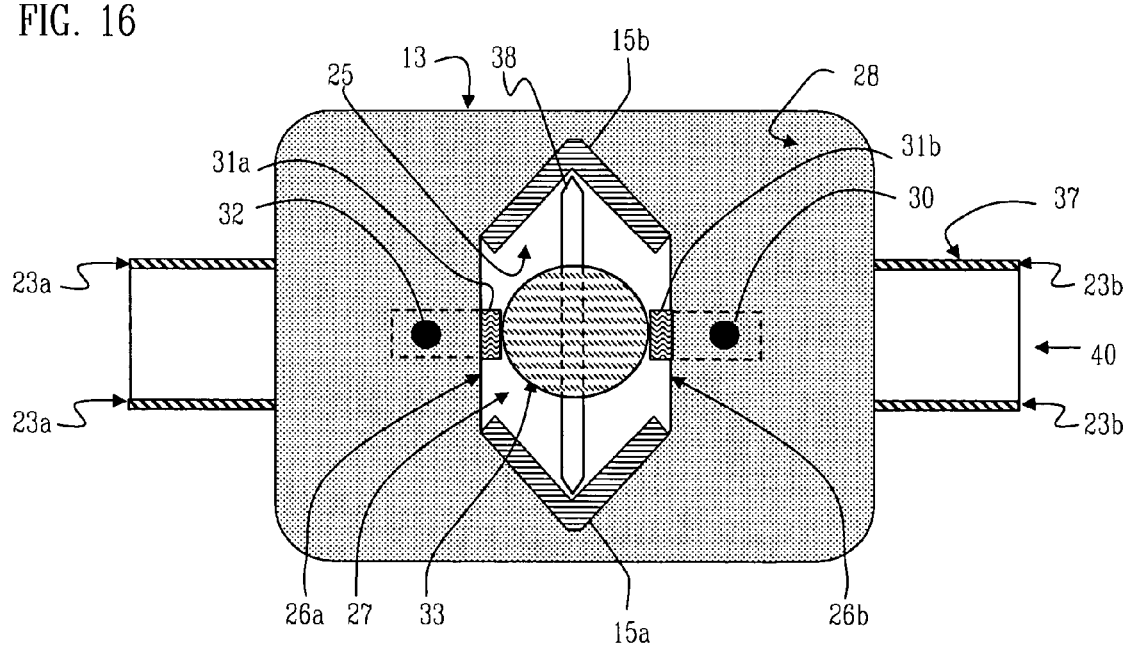
FIG. 16 is a bottom-up view of the tool taken along line 16-16 of FIG. 9 looking in the direction of the arrow.

In an alternate embodiment of the invention, as shown in FIG. 9 to FIG. 16, the width of the foot ledges 22*a* and 22*b* has been reduced from approximately 1½" to approximately ⅞" to allow for their placement and longitudinally reciprocal movement within the elongated side spaces 26*a* and 26*b* as shown in FIG. 15 and FIG. 16 formed by the two diametrically opposing elongated 90° brackets 15*a* and 15*b* and consequently removes the need for the foot bar collar 14, edging 24, bolt 17 and the diametrically opposing elongated slots 18*a* and 18*b* formed in the side walls of the lower end of handle shaft 11.

The injector tube 16, with regards to the alternate embodiment of the invention, as shown in FIG. 9 to FIG. 16, remains approximately 12" in length inclusive of the force-fit plug/end cap 33 and as an elongated circular tube disposed and longitudinally reciprocally moveable within the lower end of said elongated circular handle shaft and said elongated 90° brackets, but has been reduced in diameter from approximately ⅞" to approximately ¾" to fit snugly within the inner wall of the foot bar flanges 23*a* and 23*b*. Injector tube 16, at the lower end extends approximately 2 inches through an accommodating circular aperture in the centre of the foot bar 40 where it is perpendicularly fixed thereto dividing the foot bar 40 such that foot ledges 22*a* and 22*b* extend equally on each side of the injector tube 16 so as to provide a platform against which the operator may exert force with both feet simultaneously, at the end terminates with a force-fitted elongated circular plug/end cap 33 having a diameter slightly smaller than the diameter of the fertilizer spike at it's widest point to engage the top contact surface of the fertilizer spike and at the top end has a narrow circular guide ring 39 made of plastic or the like, is formed around the peripheral edge to facilitate smooth concentric longitudinal reciprocal movement within the handle shaft 11.

Guide Bolt 38, with regards to the alternate embodiment of the invention, as shown in FIG. 9 to FIG. 16, has been added to facilitate smooth concentric longitudinal reciprocal movement of the integrated foot bar flanges 23*a* and 23*b* and the injector tube 16 within the two diametrically opposing elongated 90° brackets 15*a* and 15*b* from the uppermost position shown in FIG. 9 to FIG. 12, to the lowermost position shown in FIG. 13 and FIG. 14. In addition, guide bolt 38 provides the aforementioned function of enabling the lock/load/release function in conjunction with spring wire 19 and as a strength reinforcement connector between the foot bar 40 and the injector tube 16. Guide Bolt 38, being a ridged circular metal rod approximate ⅛" in diameter and approximately 1½" in length with 45°-circumerencly-tapered ends, passes perpendicularly through compliant holes at the midpoint of the foot bar flanges 23*a* and 23*b* and the injector tube 16 and is fixed thereto by welding, soldering or the like to the outer wall of the foot bar flanges 23*a* and 23*b* such that equal lengths extend outwards adjacent to the inside corner of the 90° brackets 15*a* and 15*b*.

Wire Spring 19, with regards to the alternate embodiment of the invention, as shown in FIG. 9 to FIG. 16, has been repositioned further down handle shaft 11 such that it extends over the end of handle shaft 11 to engage guide bolt 38 when in the fully retracted position, rather than bolt 17, as before. Wire Spring 19, secured by a fastener such as a rivet or the like 20 to the side wall of handle shaft 11 and a compliant hole 21 in the side wall of handle shaft 11 such that the wire spring 19 extends over handle shaft 11 and is sized and positioned such that when the foot bar 40, that being foot bar flanges 23*a* and 23*b* and foot ledges 22*a* and 22*b*, is raised by the operator upward towards the handle/end cap 12, guide bolt 38 is moved to the uppermost position and passing the arc/lock-point 36 in the wire spring 19 with minimal effort, becomes engaged thereto, causing the injector tube 16 and the foot bar 40 to be held in place in the load position until released by the operator's downward depression on the top foot ledges 22*a* and 22*b* of the foot bar flanges 23*a* and 23*b* which are fixed perpendicular around the circumference of the lower end of the injector tube 16 by welding, soldering, and the like.

The two identical diametrically opposed elongated 90° brackets 15*a* and 15*b*, with regards to the alternate embodiment of the invention, as shown in FIG. 9 to FIG. 16, remain approximately ½" wide, but have been increased in length by approximately 3¾" from approximately 6" to 9½" to accommodate the 1¼" depth of the foot bar flanges 23*a*/23*b* and subsequent foot ledges 22*a*/22*b* within the vertical confines of the side spaces 26*a* and 26*b* and allow for the 2" reduction in the length of the handle shaft 11 to which the foot ledges 22*a* and 22*b* now abut when at the fully retracted position as shown in FIG. 9 to FIG. 12. This change does not change the step-up height and also as before, brackets 15*a* and 15*b* remain as two identical diametrically opposed elongated 90° brackets 15*a* and 15*b* vertically and open-face fixedly connected to the periphery at the bottom end of handle shaft 11 by welding, soldering and the like, such that an open-ended elongated hexagonal shaped chamber 25 with elongated side spaces 26*a* and 26*b* are formed as shown in FIG. 15 and FIG. 16.

The two flat springs 31*a* and 31*b*, with regards to the alternate embodiment of the invention, as shown in FIG. 9 to FIG. 16, previously fixed to the peripheral end of handle shaft 11 are relocated in this alternate embodiment and fixed by rivet 32, screw, welding, soldering, and the like, perpendicular onto the topside 30 of plate 13 such that they occupy the open sides spaces 26*a* and 26*b* formed by brackets 15*a* and 15*b* and allow foot bar flanges 23*a* and 23*b* to be longitudinally moveable over the two flat springs 31*a* and 31*b* to the topside 30 of the base plate 13.

Thus, the alternate embodiment of the invention, as shown in FIGS. 9 to 16, shows a tool, generally designated as 10, which is specifically adapted for injecting fertilizer spikes into the ground. The tool 10 consists of a hollow elongated circular handle shaft 11 approximately 1⅛" in diameter and 31¾" in length, onto which is connected a handle or end cap 12 at the upper end, a rectangular ground engaging base plate 13 approximately 2½" by 3¾" in size at the lower end and foot ledges 22a and 22b longitudinally moveable within the elongated side spaces 26a and 26b formed by the two diametrically opposing elongated 90° brackets 15a and 15b fixedly connecting the ground engaging base plate 13 to the lower end of handle shaft 11 as shown in FIG. 15 and FIG. 16.

Handle/end cap 11, foot bar collar edging 24, injector Plug/End Cap 33 and guide ring 39 are preferably manufactured out of a high density plastic or the like. The Flat springs 31a and 31b and the Wire Spring 19 are preferably manufactured from piano wire or the like, while all other parts are preferably manufactured out of metal, either galvanized or chrome plated if of steel to protect the same against the effects of corrosion and rust, or it may be manufactured of anodized aluminum or the like, with it being understood that other suitable satisfactory materials may also be utilized, such as a high density plastic and the like.

To operate the tool 10, the operators in a comfortable standing position, holds the handle shaft 11 in one hand and with the other hand, moves the foot bar collar 14, or the foot bar 40 in the case of the alternate embodiment, towards the handle/cap 12 a maximum of approximately 5½" if the tool 10 was previously left in the fully injected position, until the load/lock position is reached by the engagement of the spring wire 19 by the bolt 17 or guide bolt 38 in the alternate embodiment. A fertilizer spike 29 is then inserted, contact surface end 34 first, through aperture 27 located at the end of the tool 10 until the contact surface end 34 engages with the plug/end cap 33. Holding the handle/cap 12, the operator positions the tool 10 perpendicular to the ground engaging the ground engaging tip 41 of the fertilizer spike 29, which is extending outward from the underside 38 of the base plate 13, with the soil 35, thereby securing and stabilizing the tool 10 with the ground in the process, and steps downwardly on foot ledges 22a and 22b continuing in a like manner until the underside 37 of the foot bar flanges 23a and 23b contacts the topside 30 of the base plate 13. With the fertilizer spike 29 now at a depth of approximately 2" below the top of the soil 35, the operator steps off the tool 10 and simply lifts the tool 10 whereby the fertilizer spike 29 remains behind in the soil.

Thus this new invention 10, by it's provision of a novel construction, arrangement and combination of parts, resolves the aforementioned problems associated with the prior art by: providing a relatively inexpensive and easy method for simultaneous injection of the fertilizer spike into the soil with the ejection of the fertilizer spike from the fertilizer containment chamber with minimal step-up height; providing for full operation in an upright position; eliminating extraneous operator time, energy and effort as well as /uncomfortable/unstable/off-balance/unsafe operation; avoiding difficult, complex, awkward or supplemental procedures and/or special expertise to inject the fertilizer spike into the soil and to remove the tool from the soil while leaving the fertilizer spike behind; avoiding inadvertent displacement of the fertilizer spike; eliminating the need of maintenance to remove adhered soil from the tool and for ongoing replacement and maintenance of striker pad and rubber cushion; reducing exposure to corrosion from soil contamination; deriving an increased return from the amount of operator force applied and increasing the range of soil firmness condition applications.

The invention claimed is:

1. A tool for injecting solid fertilizer spikes into soil for tree and plant root nutrition utilizing elongated brackets, comprising:

an elongated hollow handle shaft tube having an upper end and a lower end;

a handle or end cap formed around the periphery of the upper end of the elongated hollow handle shaft tube or optionally an end plug inserted into the upper end of the elongated hollow handle shaft tube;

two identical diametrically opposing elongated brackets connected to the lower end of said handle shaft tube such that said brackets extend thereupon a distance to form an open-ended elongated hexagonal shaped fertilizer spike chamber to accommodate only that portion of the fertilizer spike which is not considered to be part of the fertilizer spike ground engaging tapered tip thereby permitting said ground engaging tapered tip to extend outward from the lower end of said brackets;

a flat base plate fixed to the lower end of said brackets with an elongated hexagonal shaped aperture located in the centre for loading therethrough a solid fertilizer spike;

said elongated hexagonal shaped aperture in said base plate is fixed directly over and inline with the bottom end of said elongated hexagonal shaped fertilizer spike chamber formed by said elongated brackets;

an elongated rigid injector tube, having an upper end and a lower end and having an outside diameter that is less than the inside diameter of said elongated hollow handle shaft tube, disposed and longitudinally reciprocally moveable within the lower end of said elongated handle shaft tube and said elongated brackets such that the lower end of said elongated rigid injector tube extends perpendicularly through and beyond an accommodating aperture in a foot bar and at the end terminates with a force-fitted plug or end cap to engage the top contact surface of the fertilizer spike;

a foot bar collar, tubular in shape, being adapted to be longitudinally moveable over and concentric to the lower end of said handle shaft tube and said two diametrically opposing elongated brackets from the uppermost position at the lower end of said handle shaft tube, for the purpose of loading the fertilizer spike, to the lowest position on top of said base plate at which point the fertilizer spike has been fully injected into the soil simultaneously with being fully ejected from said fertilizer spike chamber;

a foot bar perpendicularly fixed to the lower section of said foot bar collar with an aperture located mid-length to accommodate the end of said foot bar collar onto which it is fixed, such that a foot ledge extends equally on each side therefrom said foot bar collar so as to provide a platform against which the operator exerts force with both feet simultaneously;

said injector tube is connected to said foot bar collar by means of a bolt passing through compliant holes in the upper end of said injector tube, through compliant holes in the mid-section of said foot bar collar and through diametrically opposing elongated slots formed in the side walls of the lower end of said handle shaft tube thereby allowing said foot bar collar, said foot bar, and said injector tube to move simultaneously from the uppermost position at the bottom end of said handle shaft tube, for the purpose of loading the fertilizer spike, to the lowest position on top of said base plate at which point the fertilizer spike has been fully injected into the soil simultaneously with being fully ejected form said fertilizer spike chamber;

a wire spring, secured to the side wall of said handle shaft tube such that said wire spring is sized and positioned such that when said foot bar collar is raised by the operator upward towards said handle or end cap of said handle shaft tube, said bolt is moved to the uppermost position and passing the arc lock-point in said wire spring becomes engaged thereto, causing said fertilizer spike chamber, said injector tube, said foot bar collar and said foot bar to be held in place in the fertilizer spike load position until released by downward force by the operator on the top said foot bar;

said wire spring alternatively secured to the side wall of said injector tube such that said wire spring is sized and positioned such that when said foot bar collar is raised by the operator upward towards said handle or end cap of said handle shaft tube, said wire spring is moved to the uppermost position and passing the arc lock-point in said wire spring becomes engaged with a pin, rod or bolt fixed to said handle shaft tube, causing said fertilizer spike chamber, said injector tube, said foot bar collar and said foot bar to be held in place in the load position until released by downward force by the operator on the top said foot bar;

one or more flat springs, as a fertilizer spike retention mechanism fixed to the peripheral end of said handle shaft, parallel with said brackets and within the open sides spaces between said brackets, such that by their design and mechanical nature, easily receive and hold the fertilizer spike within said fertilizer spike chamber until ejected by said injector tube;

said one or more flat springs alternatively fixed onto said base plate within the open sides spaces formed by said two diametrically opposing elongated brackets such that the underside foot bar flanges of said foot bar are longitudinally moveable over said one or more flat springs down to the topside of said base plate;

said tool being fully operable in an upright position wherein a fertilizer spike is left embedded in the ground and detached from said tool without the need to remove said tool from the ground in a manner where, with one process of downward movement of said foot bar, two functions occur simultaneously, namely; the full injection of the fertilizer spike into the soil concurrent with the full release of the fertilizer spike from said tool by the complete ejection of the fertilizer spike from said fertilizer spike load chamber and said fertilizer spike retention mechanism of said tool.

2. A tool for injecting solid fertilizer spikes into soil for tree and plant root nutrition utilizing elongated brackets, comprising:

an elongated hollow handle shaft tube having an upper end and a lower end;

a handle or end cap formed around the periphery of the upper end of the elongated hollow handle shaft tube or optionally an end plug inserted into the upper end of the elongated hollow handle shaft tube;

two identical diametrically opposing elongated brackets connected to the lower end of said handle shaft tube such that said brackets extend thereupon a distance to form an open-ended elongated hexagonal shaped fertilizer spike chamber to accommodate only that portion of the fertilizer spike which is not considered to be part of the fertilizer spike ground engaging tapered tip thereby permitting said ground engaging tapered tip to extend outward from the lower end of said brackets;

a flat base plate fixed to the lower end of said brackets with an elongated hexagonal shaped aperture located in the centre for loading therethrough a solid fertilizer spike;

said elongated hexagonal shaped aperture in said base plate is fixed directly over and inline with the bottom end of said elongated hexagonal shaped fertilizer spike chamber formed by said elongated brackets;

a foot bar of appropriate width to be longitudinally moveable between said two diametrically opposing elongated brackets from the uppermost position at the bottom of the lower end of said handle shaft tube, for the purpose of loading of the fertilizer spike, to the lowest position on top of said base plate at which point the fertilizer spike has been fully injected into the soil simultaneously with being fully ejected from said fertilizer spike chamber;

an elongated injector tube, having an upper end and a lower end and having an outside diameter that is less than the inside diameter of said elongated hollow handle shaft tube, disposed and longitudinally reciprocally moveable within the lower end of said elongated handle shaft tube and said elongated brackets such that at the lower end of said elongated rigid injector tube extends perpendicularly through and beyond an accommodating aperture in a foot bar where it is fixed thereto dividing said foot bar such that a foot ledge extends equally on each side of said injector tube so as to provide a platform against which the operator exerts force with both feet simultaneously, at the end terminates with a force-fitted plug or end cap to engage the top contact surface of the fertilizer spike and at the upper end has a narrow circular ring formed around the peripheral edge to facilitate smooth concentric longitudinal reciprocal movement within said handle shaft tube;

said elongated brackets, said foot bar, said injector tube and said bolt by their integration and means for achieving minimal step-up height to said foot bar;

a ridged rod passes perpendicularly through compliant holes of said foot bar and said injector tube and is fixed thereto such that equal lengths extend outwards adjacent to the inside corners of said brackets such that said rod facilitates smooth concentric longitudinal reciprocal movement of said integrated foot bar and said injector tube within said two diametrically opposing elongated brackets from the uppermost position, wherein the topside of said foot bar is positioned nearest to at the bottom of the lower end of said handle shaft tube for the loading of the fertilizer spike, to the lowest position, wherein the underside of said foot bar is positioned on top of said base plate whereupon the fertilizer spike has been fully injected into the soil simultaneously with being fully ejected form said fertilizer spike chamber;

said ridged rod alternatively passes perpendicularly through compliant holes of said injector tube and is fixed thereto such that equal lengths extend outwards adjacent to the inside corners of said brackets such that said rod facilitates smooth concentric longitudinal reciprocal movement of said integrated foot bar and said injector tube within said two diametrically opposing elongated brackets a wire spring, secured to the side wall of said handle shaft tube such that said wire spring is sized and positioned such that when said foot bar is raised by the operator upward towards said handle shaft tube or end cap of said handle shaft tube, said rigid rod is moved to the uppermost position and passing the arc lock-point in said wire spring becomes engaged with said rigid rod perpendicularly fixed to said foot bar, causing said fertilizer spike chamber, said injector tube and said foot bar to be held in place in the fertilizer spike load position until released by downward force by the operator on the top said foot bar;

said wire spring alternatively secured to the side wall of said injector tube such that said wire spring is sized and positioned such that when said foot bar is raised by the operator upward towards said handle or end cap of said handle shaft tube, said wire spring is moved to the uppermost position and passing the arc lock-point in said wire spring becomes engaged with a pin, rod or bolt fixed to said handle shaft tube, causing said fertilizer spike chamber, said injector tube and said foot bar to be held in place in the fertilizer spike load position until released by downward force by the operator on the top said foot bar;

one or more flat springs, as a fertilizer spike retention mechanism, fixed onto said base plate within the open sides spaces formed by said two diametrically opposing elongated brackets such that the underside foot bar flanges of said foot bar are longitudinally moveable over said one or more flat springs down to the topside of said base plate;

said tool being fully operable in an upright position wherein a fertilizer spike is left embedded in the ground and detached from said tool without the need to remove said tool from the ground in a manner where, with one process of downward movement of said foot bar, two functions occur simultaneously, namely; the full injection of the fertilizer spike into the soil concurrent with the full release of the fertilizer spike from said tool by the complete ejection of the fertilizer spike from said fertilizer spike load chamber and said fertilizer spike retention mechanism of said tool.

\* \* \* \* \*